(12) United States Patent
Dinwoodie et al.

(10) Patent No.: US 7,276,280 B2
(45) Date of Patent: Oct. 2, 2007

(54) FIBRE MATS

(76) Inventors: John Dinwoodie, 9 Pineridge Close, Spital, Wirral (GB) L62 2EE; Angus William Newton, 24 Aughton Road, Birkdale, Southport (GB) PR8 2AG; Katherine Wade, 19 Riverside Park, Northwich, Cheshire (GB) CW8 1DS ( * ) Notice: Subject to any disclaimer, the term of this patent is extended or adjusted under 35 U.S.C. 154(b) by 0 days.

(21) Appl. No.: 10/512,217

(22) PCT Filed: Dec. 17, 2003

(86) PCT No.: PCT/GB03/05505

§ 371 (c)(1),
(2), (4) Date: Nov. 17, 2004

(87) PCT Pub. No.: WO2004/054942

PCT Pub. Date: Jul. 1, 2004

(65) Prior Publication Data

US 2005/0148252 A1    Jul. 7, 2005

(30) Foreign Application Priority Data

Dec. 17, 2002    (GB) ................. 0229380.1

(51) Int. Cl.
*A01K 1/015*    (2006.01)
*B01D 24/00*    (2006.01)
*B01J 35/02*    (2006.01)

(52) U.S. Cl. .................. 428/221; 55/523; 422/221
(58) Field of Classification Search ............... 428/688, 428/113, 212, 325, 221, 320; 264/63; 55/523; 501/35; 422/221; 442/172, 178, 340, 344, 442/410
See application file for complete search history.

(56) References Cited

U.S. PATENT DOCUMENTS

| 3,510,394 | A | | 5/1970 | Cadotte |
| 3,785,838 | A | * | 1/1974 | Weidman .................. 501/128 |
| 4,269,887 | A | | 5/1981 | Sonobe et al. |
| 4,447,345 | A | | 5/1984 | Kummermehr et al. |
| 4,849,382 | A | | 7/1989 | Shibata et al. |
| 5,290,350 | A | | 3/1994 | Besnard et al. |
| 5,419,975 | A | * | 5/1995 | Lintz et al. .................. 428/688 |
| 5,567,536 | A | | 10/1996 | Lintz et al. |
| 5,580,532 | A | | 12/1996 | Robinson et al. |
| 5,666,726 | A | | 9/1997 | Robinson et al. |
| 5,811,063 | A | | 9/1998 | Robinson et al. |
| 6,855,298 | B2 | * | 2/2005 | TenEyck .................. 422/179 |
| 6,987,076 | B1 | * | 1/2006 | Jubb et al. .................. 501/35 |
| 7,033,412 | B2 | * | 4/2006 | Kumar et al. .................. 55/523 |

FOREIGN PATENT DOCUMENTS

| EP | 0 009 940 | 4/1980 |
| EP | 0 398 130 | 11/1990 |
| EP | 0 522 722 | 1/1993 |
| EP | 0 363 911 | 6/1993 |
| GB | 2319 247 | 5/1998 |

OTHER PUBLICATIONS

European Office Action dated Sep. 18, 2006.

* cited by examiner

*Primary Examiner*—N. Edwards
(74) *Attorney, Agent, or Firm*—Nixon & Vanderhye, P.C.

(57) ABSTRACT

A fibre mat (1) comprises inorganic fibres (3; 5) held in a flocculated binder system (4), the binder system comprising less than 12 w/w % of the mat. The binder-fibre flocs (3, 4) may be held together with relatively long inorganic fibres (5). A film cover layer (6) may be present.

21 Claims, 5 Drawing Sheets

FIBRE MATS

This application is the U.S. national phase of international application PCT/GB2003/005505 filed 17 Dec. 2003 which designated the U.S. and claims benefit of GB 0229380.1, dated 17 Dec. 2002, the entire content of which is hereby incorporated by reference.

This invention relates to mats and, in particular to mats which can be used to support ceramic, metal or other monoliths in exhaust systems. For example, in apparatus for the catalytic conversion of gases emitted from combustion chambers.

Catalytic converters are used on motor vehicles to reduce the amount of noxious chemicals which are emitted to the atmosphere by catalytically oxidising gases produced during the combustion of fossil fuels. To convert pollutant gases into less atmospherically harmful ones, exhaust gases are passed through a monolith which provides a large heterogeneous catalytic surface to oxidise the pollutant gases. Diesel particulate filters (DPFs) are used on diesel engine powered vehicles to reduce the amount of particulate matter emitted. DPFs may also be arranged to catalyse reduced gases (e.g. CO, hydrocarbons) which would otherwise be emitted.

Exhaust gases are emitted from the combustion chamber and, consequently, are hot. The monolith is located within a metal can, mounted as part of a vehicle's exhaust system, through which the exhaust gases pass. As the engine starts and begins to emit gases, the exhaust system is heated. Monoliths have different expansion coefficients to the cans in which they are located, they are also relatively expensive and so the reduction or limitation of damage thereto is an important consideration. To ensure that the monoliths are securely held within the can, mats are wrapped around the monoliths prior to their installation in the can. It is necessary for the mats to be fabricated from fibres which can withstand the thermal cycling conditions. The density of the mat must also be controlled to ensure that, as the monolith and can differentially expand, the pressure exerted on the monolith is not sufficient to cause damage. The mat also protects the monolith from damage cause by vibration of the vehicle. The mat must have an internal laminar shear strength sufficient to hold the monolith during use.

Typical prior art mats are formed from inorganic fibres, formed from say alumina or aluminosilicates, held in, say, an organic binder matrix. The organic binder matrix usually comprises about 10% of the total weight of the mat and, as the hot gases pass through the monolith, it is burnt off to leave a purely inorganic mat. The binder ensures that the mat can be handled and installed in the can.

As mentioned above, different engines (i.e. diesel or petroleum) require different filtration and/or catalytic conversion systems (e.g. DPFs, Diesel Oxidation Filters (DOFs) or close-coupled catalytic converters (CCCs) for petroleum engines). Different monoliths may be located at different locations in the exhaust system. For example, CCCs are placed relatively close to the combustion chamber so that they heat up to their minimum operating temperature (~300-350° C.) very quickly upon engine start up. Therefore, different monoliths operate at, or are exposed to, different temperature regimes. It is desired to provide a mat which can be used to support all or at least most monoliths and which exhibit suitable performance characteristics over a large temperature range (e.g. 0-1100° C.).

Particular problems occur when using known mats to support some monoliths, whether catalytic converters or not. For example, DPFs operate at relatively low temperatures. The face adjacent the monolith may reach a temperature of, say 300° C., whilst the face adjacent the can will be significantly lower. When using a typical prior art mat, as described above, at such temperatures the organic binder adjacent the monolith is exposed to heat which is sufficient to cause burn-off of the binder.

However, at the outer face the temperature is not high enough to burn-off the binder. Accordingly, at some point across the thickness of the mat there will be a burn-off interface. The binder which is not burnt off is heated and becomes hard or 'boardy'. Such 'boardiness' causes a shear plane to form at the burn-off interface. Further, because a portion of the mat is 'boardy' it can no longer expand and contract as required upon heating, thereby reducing the holding force exerted on the monolith. Further, the 'boardy' part of the mat will cause a pressure dip across the converter during initial heat up.

As the operating temperatures are set by the in-use characteristics of the monolith, the temperature cannot be increased to ensure total burn-off. Accordingly, it is a desideratum to provide a mat which overcomes these problems. It has been proposed to reduce the binder concentration in mats for DPFs. For example, WO 01/71170 A1 discloses an inorganic fibre mat which has an organic binder content of up to 2 w/w %, the reduction in binder over typical prior art mats being achieved by consolidating the mat using needle-punching.

It is a further desideratum to provide a mat which can be used to support a variety of monoliths and a mat which can offer effective support at a range of operating temperatures.

It is an object of this invention to provide mats which satisfy one or more of the above desiderata whilst exhibiting improved performance over the prior art Accordingly, a first aspect of the invention provides a method of manufacturing a fibre mat, the method comprising the steps of forming a slurry of fibres in a liquid carrier, adding flocculated binder to the slurry, stirring to form binder-fibre flocs and drying the flocculated slurry.

A second aspect of the invention provides a method of manufacturing a fibre mat, the method comprising the steps of forming a slurry of fibres in a liquid carrier, adding binder to the slurry, flocculating and stirring the mixture to form binder-fibre flocs and drying the flocculated slurry.

The binder is preferably flocculated by adding a flocculent.

In one embodiment, the method comprises the further step of adding relatively long fibres to the flocculated slurry and preferably randomly dispersing the fibres throughout the slurry. In a second embodiment, relatively long fibres are added to the slurry prior to flocculation.

The flocculated slurry may be compressed during the drying step to a predetermined density.

A surface layer may be applied to the mat either prior to drying or after drying. The surface layer can help in reducing the friction coefficient of the mat, thereby easing caning operations. The surface layer is flexible and is applied to one side of the mat. The surface layer is preferably formed from a material which pyrolyses or burns at the operating temperature of the converter and which, preferably, produces no toxic emissions upon burning or pyrolysis.

Suitable materials for the surface layer may include paper, such as tissue paper or craft paper, polyethylene terephthalate (PET) film. Other organic substances may be applied to the surface to form a surface layer, such as latex rubber (preferably having a higher glass transition temperature than that of the binder system), polyvinyl alcohol film (PVA), polyethylene film (PE) or other materials which can form a flexible layer. The flexibility is necessary to ensure that the surface layer does not crack or delaminate when being wrapped around a monolith.

It is most preferred that the coefficients of static and kinetic friction, measured between the surface of the mat bearing the surface layer and the can in which the mat may be mounted, are respectively less than 0.5 and 0.4.

A third aspect of the invention provides a fibre mat, the mat comprising inorganic fibres held in a flocculated binder system, the binder system comprising less than 5 w/w % of the mat.

A small proportion of the fibres may be relatively long fibres, preferably from about 8 to 16 mm long, more preferably 10 to 14 mm long and yet more preferably 11 to 13 mm long, with a mean diameter of from say 1 to 10 μm, preferably 5 to 7 μm. Preferably, less than 5 w/w % of the inorganic fibres are relatively long fibres, say 2 w/w %. The fibres may be composed of a material which is stable at the intended operating temperatures, for example $SiO_2$ fibres. The relatively long fibres preferably interconnect the distinct flocs.

There is further provided, in a fourth aspect of the invention a fibre mat comprising inorganic fibres held in a flocculated binder system and relatively long fibres, at least some of the relatively long fibres interconnecting the binder-inorganic fibre flocs.

A further aspect of the invention provides a method of forming a mat with increased laminar shear strength at a given fibre gap bulk density, the method comprising forming a mat from inorganic fibre-binder flocs and interconnecting at least some of the distinct flocs with relatively long fibres.

A yet further aspect of the invention provides a fibre mat, the mat comprising inorganic fibres held in a binder system, the mat having an organic coating on a surface thereof, wherein the total organic content of the mat is less than 5%.

Preferably the binder system is flocculated.

The binder system may comprise curable polymers such as a curable acrylic polymer and a cross-linking agent, for example an epoxy group containing cross-linking agent such as an epoxy resin. The acrylic polymer may be a homopolymer or copolymer comprising monomer units derived from at least one acrylic monomer selected from the $C_{1-8}$ alkyl ($C_{1-4}$ alkyl)acrylates and, in a preferred embodiment, is a homopolymer or copolymer comprising monomer units selected from the $C_{1-4}$ alkyl (meth)acrylates, for example methyl methacrylate, methyl acrylate, ethyl acrylate, propyly acrylate or butyl acrylate. One suitable example of such a binder is a copolymer based on n-butyl acrylate and acrylonitrile. The proportion by weight of curable polymer to cross-linking agent is preferably in a range from 99:1 to 90:10, most preferably in a range from 99:1 to 95:5.

The binder system also preferably comprises pulp formed from vegetable matter. The pulp may comprise cellulose, hemp or both fibres. For example, the vegetable component may be 60% cellulose pulp, 40% hemp pulp. The vegetable matter preferably, comprises up to 50 w/w % of the binder system.

In a preferred embodiment, the binder system content is in a range from 2 to 3.5 w/w % with respect to the fibres, of which between 40 and 70% is pulp, the remainder being curable polymer and crosslinking agent.

The fibres are preferably thermally stable inorganic fibres, stable at temperatures in excess of 700° C., preferably in excess of 800° C. and more preferably in excess of 900° C. Such fibres include ceramic fibres such as alumina, mullite, aluminosilicate, aluminoborosilicate, zirconia, titania as well as vitreous glass fibres. The preferred thermally stable inorganic fibres are polycrystalline inorganic fibres, for example, alumina, mullite, aluminosilicate, aluminoborosilicate, zirconia and titania fibres. Of these, alumina fibres, which may comprise up to 30 w/w % $SiO_2$ as a phase stabiliser, are particularly preferred.

The fibres are preferably short staple fibres having a length in a range from 0.01 to 5 mm, preferably 0.1 to 3 mm and a mean diameter of, say, from 1 to 10 μm. Especially preferred fibres are those sold under the trade names Saffil and M-fil by Saffil Limited, Widnes, United Kingdom, comprising respectively about 3 to 5 and 10 to 30 w/w % $SiO_2$ as a phase stabiliser.

In order that the invention may be more fully understood it will now be described by way of example only and with reference to the accompanying drawings, in which:

To manufacture mats in accordance with the invention, the following Examples were followed:

EXAMPLE 1

Pulp Preparation 4.8 kg of cellulose pulp (N-BKP pulp made in Canada) and 3.2 kg of hemp pulp (TMSP-2B4D made in the Philippines) are placed in a beater with 400 l of water. The mixture was beaten for 12 to 14 hours until the fibre length was from 30 to 600 μm, the fibre concentration being 2%.

Binder Preparation 7.5 l of the pulp (i.e. 150 g fibre) was placed in a container, to which 0.22 l of latex was added with stirring to form Solution A. (A suitable latex solution is Appratan HRS supplied by Clariant of Muttenz, Switzerland, which is a 45% solution of 95% n-butyl acrylate/5% acrylonitrile, i.e. 100 g of latex.)

10 $cm^3$ of 20% Alumina sol was added to Solution A with mixing to form Solution B.

250 $cm^3$ of Percol 292 (concentration 0.5%) was added to Solution B with stirring to form the binder which has a clear surface layer due to flocculation.

Mat Preparation 10 kg of M-Fil fibres were placed in a pulper to which 2000 l of water were added to form a slurry of fibres.

The binder prepared above was added.

The resulting solution was mixed for 15 s in the pulper.

A cross-linking agent (methylol acrylamide) is added to the resulting solution and mixed.

The flocculated slurry is then vacuum formed into a mat using conventional techniques. The slurry is poured onto a vacuum forming jig were it is dried under compression, with or without heating to provide a mat having a thickness of between 3 and 15 mm to obtain a desired basis weight to provide the necessary gap density when installed in a can supporting a monolith.

EXAMPLE 2

The mat of Example 1 was fabricated. After the drying and compression stage a PVA film was adhered to one face thereof using a cellulose base adhesive. The PVA film was about 20 µm thick (typically the film may be from 10 to 30 µm thick).

EXAMPLE 3

The mat of Example 1 was fabricated. After the drying and compression stage a PE film was adhered to one face thereof using a hot melt adhesive supplied by Ultramark. The PE film was about 25 µm thick.

EXAMPLE 4

The mat of Example 1 was prepared with the exception that 200 g of $SiO_2$ fibres having a length of 12 mm and a median diameter of 6 µm were added to the pulper and mixed with the slurry prior to addition of the binder solution.

EXAMPLE 5

The mat of Example 1 was prepared with the exception that 200 g of $SiO_2$ fibres having a length of 12 mm and a median diameter of 6 µm were added to the pulper subsequent to addition of the binder solution to the slurry, the whole being mixed to form a homogeneous mixture.

EXAMPLE 6

To the mat of Example 4, a PVA coating in accordance with Example 2 was added.

EXAMPLE 7

To the mat of Example 4, a PE coating in accordance with Example 3 was added.

Figure 1:
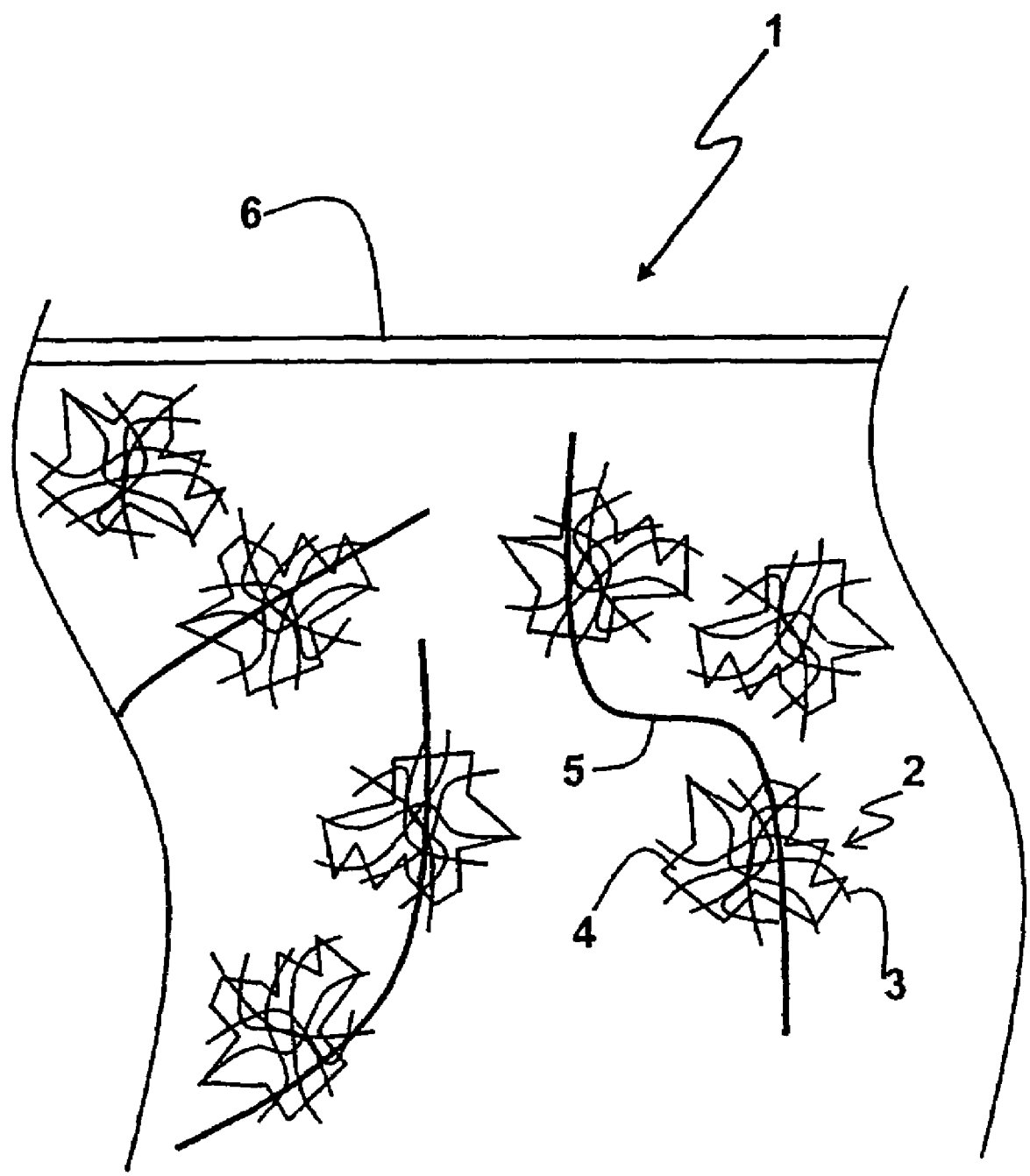
FIG. 1 is a schematic representation of the flocculated slurry prior to drying.

Referring now to FIG. 1, there is shown a portion of a mat 1 of Example 6, having a plurality of distinct flocs 2, formed from relatively short M-Fil fibres 3 held in flocculated binder 4. The flocks 2 are interconnected by relatively long $SiO_2$ fibres 5. Prior to the vacuum forming/drying and compressing step, a PVA film 6 is applied to one surface of the mat 1.

Subsequent to drying and compressing the mat 1 is used to wrap a monolith (not shown) for a DPF which is inserted in a can (also not shown). The coefficient of static friction between the surface of the can and the mat 1 was found to be 0.45, the coefficient of kinetic friction was found to be less than 0.4.

Figure 2:
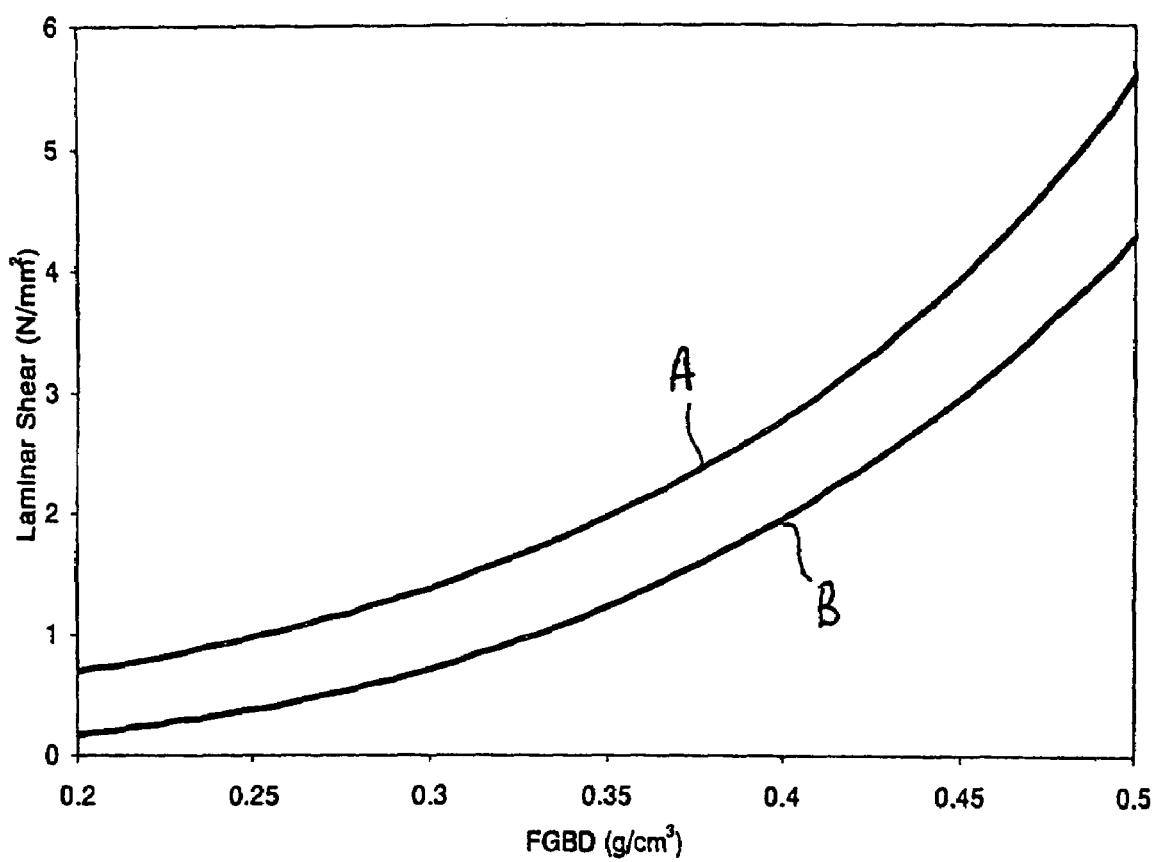
FIG. 2 is a graph showing the laminar shear strength of a mat of the invention compared to a prior art mat.

Referring now to FIG. 2, there is shown a graph of the inter-mat laminar shear strength against fibre gap bulk density (i.e. the density of the fibres when installed) (FGBD). Line A is the data for a mat made in accordance with Example 4 and line B is the data for a low-binder composition, needle-punched mat of the prior art. As is demonstrated, the mat of the invention has greater laminar shear strength than the prior art mat over the range of FGBD investigated.

Figure 3:
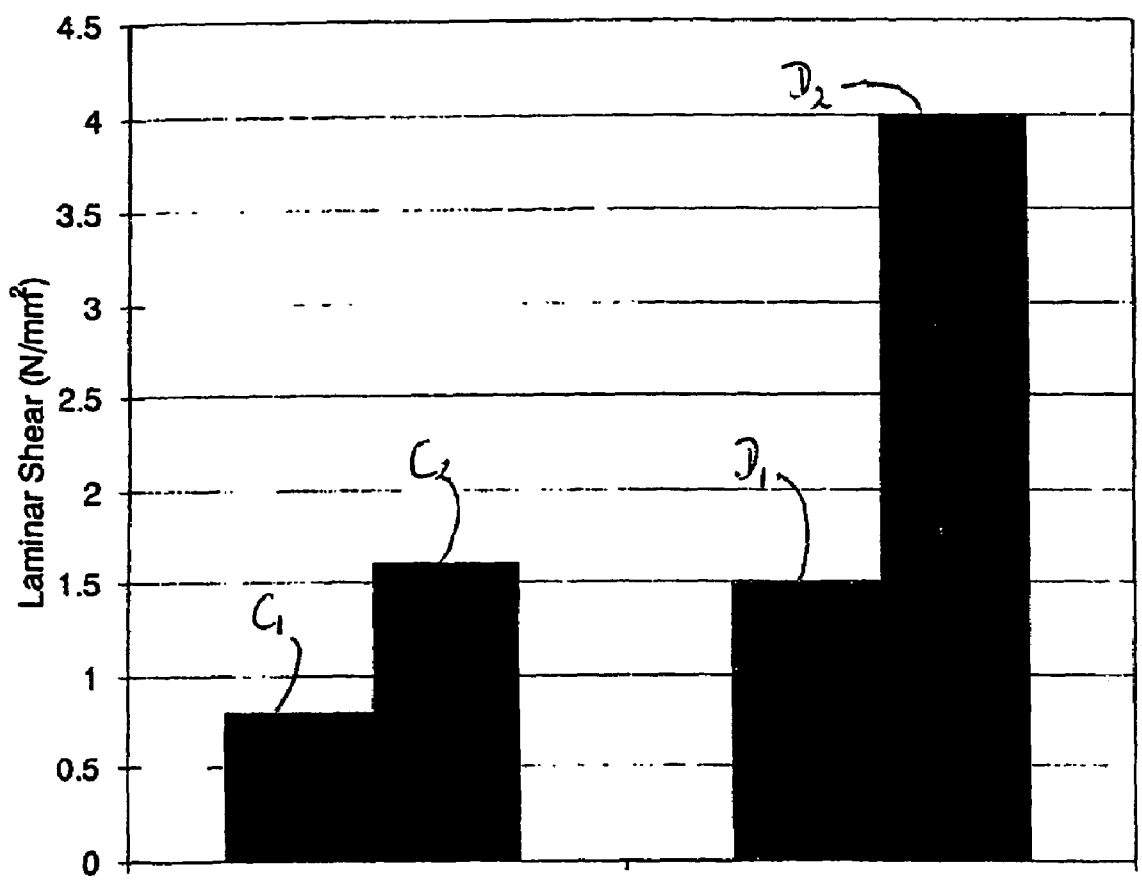
FIG. 3 is a graph showing the laminar shear strength of mats of the invention.

FIG. 3 shows the values of laminar shear strength at an FGBD of 0.3 and 0.4 $gcm^{-3}$ for the mat of Example 1 (bars $C_1$ and $C_2$ respectively) and the mat of Example 4 (lines $D_1$ and $D_2$ respectively). As can be seen, the laminar shear strength for the mat having floc interconnecting relatively long fibres is greater at both values of FGBD. Whilst we do not wish to be limited by any theory, we believe that this is due to the relatively long fibres resisting shear.

Figure 4:
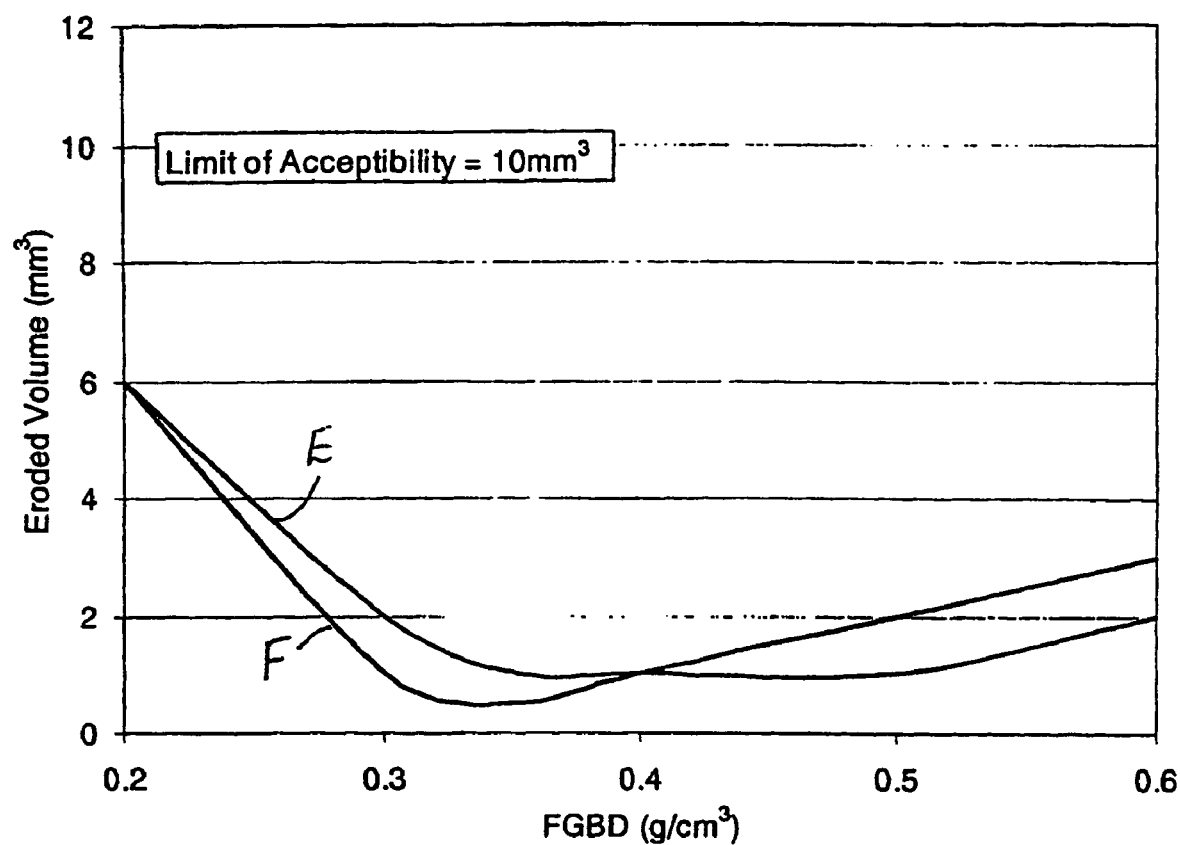
FIG. 4 is a graph showing the eroded volume of mats of the invention.

FIG. 4 shows data for the eroded volume of mats according to the invention at different values of FGBD. Line E is the data for a mat made in accordance with Example 1 and line F is the data for a mat made in accordance with Example 4. Samples of 20 $cm^2$ of each mat was clamped between metal plates at a particular value of FGBD and subjected to a cold gas source (i.e. room temperature) pulsed at 200 Hz for one hour. The data shows that both mats have excellent erosion resistance.

Figure 5:
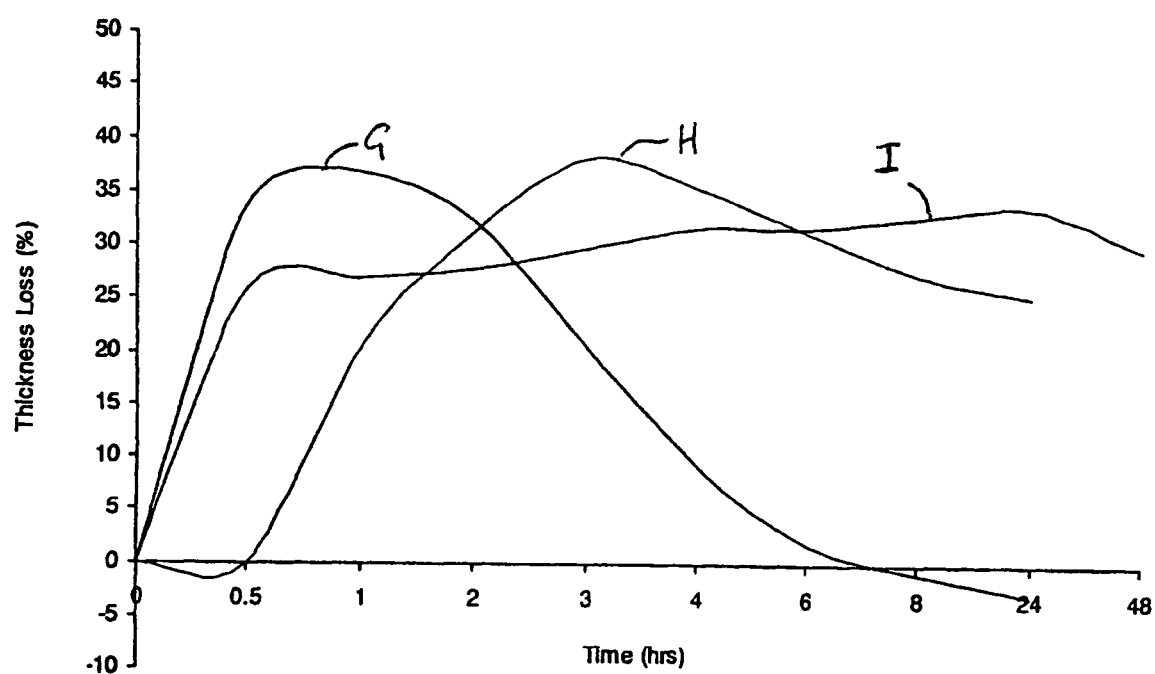
FIG. 5 is a graph showing the boardiness behaviour of mats of the invention and prior art mats.

FIG. 5 shows data representing boardiness behaviour. Line G is data for mats made in accordance with both Example 1 and Example 4. Lines H and I represent data for two prior art mats containing about 10% binder. Samples of 50 $cm^2$ were heated at 300° C. at an FGBD of 0.3 g $cm^{-3}$ over the time period shown. As is demonstrated, the mats according to the invention show a decrease in thickness but then recover to show a slight increase of thickness at longer periods. In contrast, the thickness loss of the prior art mats increases or at least does not decrease as rapidly or as quickly as in the mats of the invention. Whilst we do not wish to be limited by any particular theory, we believe that this is due to more efficient burn out of the binder. Thus, mats of the invention are more suitable for use in diesel operations (i.e. lower temperature operations) because they will exert a more constant, and hence more secure and predictable, holding force on the monolith.

Whilst the above Examples demonstrate mats fabricated from M-Fil fibres, Saffil fibres can also be used as well as other inorganic fibres. For example, a mat can be fabricated using the binder system of Example 1 and the following fibre mix: 60 parts Saffil fibres, 10 parts M-Fil fibres and 30 parts $SiO_2$ fibres having a mean length of about 12 mm. In this case the binder is likely to represent about 10 to 12 w/w % of the mat.

Further, with a binder system of up to 5 w/w % of the mat, up to 5 w/w % of the fibres may be relatively long fibres.

It is preferred that the total organic content of the mat, including the film layer is about 5 w/w % or less.

Other relatively long fibres may be used such as alumina silicon carbide and like fibres.

Due to the nature of the fibres and of the binder system, the mats made in accordance with the invention can be used to support a variety of monoliths, for example those used in CCCs, DPFs and Diesel Oxidation Systems.

The invention claimed is:

1. A fibre mounting mat to support a monolith in an exhaust system, the mat comprising inorganic fibres held in a flocculated binder system, the binder system comprising less than 12% by weight (w/w %) of the mat, wherein the inorganic fibres comprise a plurality of relatively short fibres with a length of from 0.01 mm to 5 mm and a plurality of relatively long fibres with a length of from 8 mm to 16 mm.

2. A mat according to claim 1, wherein the relatively long fibres are from 10 mm to 14 mm long.

3. A mat according to claim 1, wherein the relatively long fibres are from 11 mm to 13 mm long.

4. A mat according to claim 1, wherein the relatively long fibres have a mean diameter of from 1 µm to 10 µm.

5. A mat according to claim 1, wherein the relatively long fibres comprise up to 30% by weight (w/w %) of the inorganic fibres.

6. A mat according to claim 5, wherein the relatively short fibres are a mixture of alumina and inullite fibres.

7. A mat according to claim 5, wherein the relatively long fibres comprise 5% by weight (w/w %) or less of the inorganic fibres and the binder system comprises 5% by weight (w/w %) or less of the mat.

8. A mat according to claim 7, wherein the relatively short fibres comprise alumina or mullite fibres.

9. A mat according to claim 1, wherein the relatively long fibres comprise silica.

10. A mat according to claim 1, wherein the relatively long fibres interconnect flocs of binder and relatively short fibre.

11. A mat according to claim 1, further comprising a surface layer applied to one or both major surfaces thereof.

12. A mat according to claim 11, wherein the total organic content of the mat is in the range of 5% by weight (w/w %) or less, and the relatively long fibres comprise up to 5% by weight (w/w %) of the inorganic fibres.

13. A combination of a mat according to claim 1, a monolith about which the mat is wrapped and a can in which the wrapped monolith is inserted or insertable, the coefficients of static and kinetic friction, measured between the surface of the mat and the cans are respectively less than 0.5 and 0.4.

14. A method of manufacturing a fibre mounting mat for supporting a monolith in an exhaust system, the method comprising the steps of forming a slurry of relatively short inorganic fibres having a length of from 0.01 to 5 mm and relatively long inorganic fibres having a length of 8 mm to 16 mm in a liquid carrier, adding flocculated binder to the slurry, stirring to form binder-fibre flocs and drying the flocculated slurry, and wherein the mat comprises the inorganic fibres held in a flocculated binder system, and the binder system comprises less than 12% by weight (w/w %) of the mat.

15. A method according to claim 14, further comprising, during the drying step, compressing the flocculated slurry to a predetermined density.

16. A method of manufacturing a fibre mounting mat for supporting a monolith in an exhaust system, the method comprising the steps of forming a slurry of relatively short inorganic fibres having a length of from 0.01 mm to 5 mm in a liquid carrier, adding binder to the slurry, flocculating and stirring the mixture to form binder-fibre flocs; adding, with stirring, relatively long inorganic fibres having a length of from 8 mm to 16 mm to the binder-fibre flocs and drying the flocculated slurry, and wherein the mat comprises the inorganic fibres held in a flocculated binder system, and the binder system comprises less than 12% by weight (w/w %) of the mat.

17. A method according to claim 16, comprising, during the drying step, compressing the flocculated slurry to a predetermined density.

18. A method according to claim 16, comprising applying a surface layer to the mat either prior to drying or after drying.

19. A method according to claim 16, comprising applying a surface layer to the mat after drying.

20. A method of forming a mounting mat for supporting a monolith in an exhaust system with increased laminar shear strength at a given fibre gap bulk density, the method comprising forming a mat from relatively short inorganic fibre-binder flocs and interconnecting at least some of the flocs with relatively long inorganic fibres having a length of from 8 mm to 16 mm, the relatively short fibres having a length of from 0.01 mm to 5 mm, and wherein the mat comprises the inorganic fibres held in a flocculated binder system, and the binder system comprises less than 12% by weight (w/w %) of the mat.

21. A method according to claim 20, comprising applying a surface layer to the mat either prior to drying or after drying.

\* \* \* \* \*